Jan. 6, 1925.

H. E. WARREN

FREQUENCY REGULATION

Filed July 13, 1922

1,522,216

Inventor:
Henry E. Warren,
by *[signature]*
His Attorney.

Patented Jan. 6, 1925.

1,522,216

UNITED STATES PATENT OFFICE.

HENRY E. WARREN, OF ASHLAND, MASSACHUSETTS, ASSIGNOR TO WARREN CLOCK COMPANY, A CORPORATION OF MAINE.

FREQUENCY REGULATION.

Application filed July 13, 1922. Serial No. 574,801.

*To all whom it may concern:*

Be it known that I, HENRY E. WARREN, a citizen of the United States, residing at Ashland, county of Middlesex, State of Massachusetts, have invented certain new and useful Improvements in Frequency Regulation, of which the following is a specification.

My invention relates to alternating current frequency controlling and regulating devices and is especially beneficial for regulating the frequency of alternating time distributing systems.

On existing alternating current distributing systems the frequency variation is often too great to permit its utilization for the distribution of time by means of synchronous motor driven clocks. It is the primary object of my invention to provide simple apparatus by means of which such a system may be utilized to supply a constant definite frequency to another alternating current system such, for example, as an alternating time distributing system. In carrying my invention into effect I provide a variable frequency transformer in the form of an induction motor. This is accomplished by connecting the primary of the motor to the variable frequency source of supply, holding the speed of the motor to a small percentage of its normal value and regulating said speed so that the frequency delivered by the secondary member of the motor is of the desired periodicity.

The features of my invention which I believe to be novel and patentable will be pointed out in the claims appended hereto. The preferred arrangement of my controlling system and its theory of operation will be explained in connection with the accompanying drawings in which Fig. 1 shows a manually adjustable frequency converting system and Fig. 2 shows a frequency converting system provided with automatic means to maintain the secondary frequency at a constant periodicity.

Figure 1:
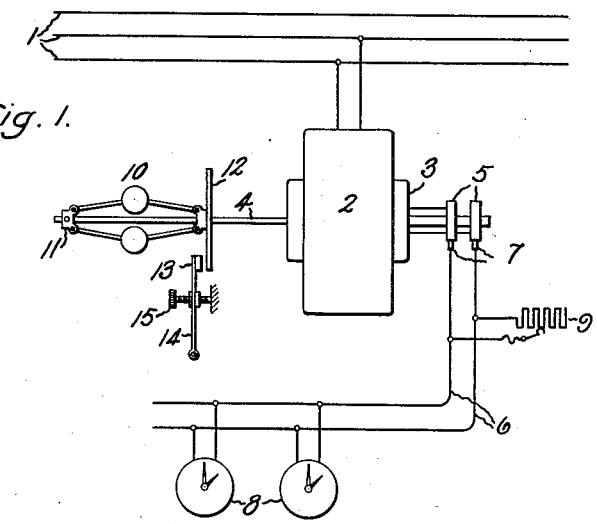
Figure 2:
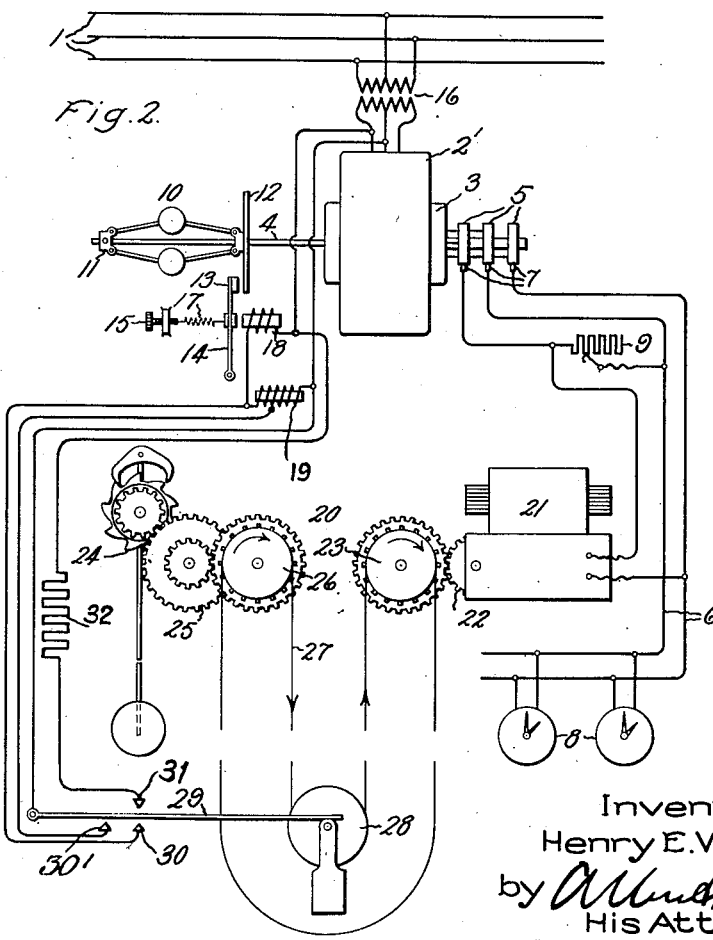

Referring now to the drawings in which like parts are designated by like reference characters throughout, and more in particular to Fig. 1, 1 indicates a commercial alternating current distributing system; 2 indicates in this instance a single phase induction motor having its primary, preferably the stator, connected to source 1. The primary winding will be provided with some well known form of starting connection such as the split phase connection and will be liberally designed so as to be capable of continuous operation under starting conditions. The secondary member 3 of the motor, which in this instance is the rotor, is mounted on a shaft 4. The secondary member is of the wound type and is connected to slip rings 5. A single phase secondary system 6 is supplied from the slip rings 5 by means of brushes 7. The secondary system is shown supplying a plurality of secondary clocks 8 which are preferably driven by self-starting synchronous motors such for example as shown and described in my U. S. Patent 1,283,434, October 29, 1918, assigned to the same assignee as the present invention. Preferably an adjustable load 9 is also connected to the secondary system for the purpose of keeping the total secondary load substantially constant when secondary clocks or other translating devices are added to or taken off the system. A centrifugal governor operated brake is also driven from shaft 4 and in the present instance the governor 10 has one end 11 secured directly to the shaft 4 and its other end is provided with a brake disc 12 and slides back and forth on the shaft in response to the centrifugal action of the governor 10. Cooperating with disc 12 is a stationary brake pad 13 which is preferably adjustable toward and away from disc 12 by means of the pivoted arm 14, on which the pad is mounted, and the thumbscrew 15.

The operation of the apparatus illustrated in Fig. 1 may be explained as follows: Let us assume the normal frequency of the supply line 1 to be 60 cycles and that motor 2 is a 4-pole motor. The synchronous speed of the motor, if it were allowed to run at that speed, would therefore be 1800 R. P. M. However, if the rotor 3 of motor 2 is held stationary it will act as a transformer and deliver 60 cycles current to the slip rings 5 and the secondary system 6. If the secondary is allowed to rotate at say 180 R. P. M. it will act both as a motor and a transformer and will deliver a 54 cycle alternating current to the secondary system.

Let us assume, therefore, that the secondary current load, comprising clocks 8 and load 9 and such other translating devices as it is desired to supply at this lower frequency and the brake load produced by the centrifugal governor 10, disc 12 and brake pad 13, are so proportioned and adjusted as to permit motor 2 to run at 180 R. P. M. with normal voltage and frequency supplied to its primary. The secondary clocks 8 are so geared to their electric driving motors as to keep accurate time when the frequency of the secondary system is maintained at the desired value, which in the example here given is 54 cycles. Now, if the frequency of system 1 should drop say to 59 cycles, rotor 3 would tend to run at the same speed as before because the centrifugal governor 10 is set to allow rotor 3 to run at 180 R. P. M. The frequency delivered to the secondary system would therefore be lowered a proportionate amount and the clock would run too slow. To correct this, thumbscrew 15 should be adjusted to move brake pad 13 toward disc 12 to such an extent as to lower the speed of rotor 3 the amount necessary to bring the frequency supplied to the secondary system up to 54 cycles. For supply frequencies above normal rotor 3 should be allowed to rotate faster than 180 R. P. M. in order to deliver the correct frequency to the secondary system. The relation between primary frequency F, secondary frequency $f$ and motor speed S expressed in R. P. M. is represented by the equation $$f = F - \frac{BS}{60}$$ where P equals the number of pairs of poles of the motor. The system shown in Fig. 1 is suitable for obtaining a lower frequency where the primary frequency is fairly constant or is suitable for supplying a secondary clock system where the primary frequency is substantially constant and the time accuracy guaranteed for the secondary clocks is not too exacting. Thus, it might be sufficient to adjust the thumbscrew 15 say once a week in order to maintain the time as given by the secondary clocks within the required degree of accuracy.

The arrangement shown in Fig. 2 is designed to automatically correct for the usual variations in frequency and voltage of the supply system and to maintain the accumulated error in frequency to such a low value that the time expressed by the secondary clock system is always accurate to within a few seconds so long as power is supplied to the primary system and is designed to automatically correct for accumulated errors in frequency due to interruptions of service in the supply system.

In Fig. 2 I have shown the motor 2' as a polyphase motor having its primary connected to the supply system 1 by way of a step-down transformer 16. The secondary load is preferably balanced across the secondary phases in the manner illustrated although this is not essential and the motor might be of the single phase type illustrated in Fig. 1 if desired. In Fig. 2, the brake pad arm 14 is biased away from braking position by an adjustable spring 17 and toward braking position by a magnet 18 cooperating with an armature on arm 14. The magnet 18 is connected in this instance across one phase of the secondary of transformer 16 and in series with a reactance 19. The reactance may be adjustable if desired. As thus connected, the effect of magnet 18 on lever 14 will be proportional to the primary voltage and, due to the reactance of this circuit, inversely proportional to the primary frequency.

As thus far described the operation of the system shown in Fig. 2 is as follows: The brake pad 13 will be adjusted relative to disc 12 to give the correct secondary frequency for a given secondary load with normal primary voltage and frequency. Now, an increase in primary voltage will tend to speed up the motor due to the increased torque developed. However, an increase in speed is prevented because now more current flows through magnet 18 causing it to draw lever arm 14 and brake pad 13 slightly toward disc 12 and the increased braking effect thus produced is made just sufficient to compensate for the increased motor torque due to the higher voltage whereby the motor speed and secondary frequency is maintained constant. An increase in primary frequency without a corresponding increase in voltage will not however produce an increase in torque and the motor would ordinarily tend to run at the same speed due to the centrifugal breaking action and the secondary frequency would be too high. However, due to the reactance in the circuit of magnet 18 less current will now flow therethrough and spring 17 will draw lever 14 and pad 13 slightly away from disc 12 allowing the motor speed to increase the necessary amount to keep the secondary frequency at the correct value. If both the frequency and voltage of the primary system increases, the effect of magnet 18 will remain constant and the increased torque developed will raise the speed slightly and maintain the secondary frequency constant. By properly adjusting the relative effect of the controlling devices just explained, a high degree of accuracy may be maintained on the secondary frequency with the usual variations in voltage and frequency of the source 1. I do not wish to be limited to the particular controlling arrangement shown and described as it will be evident that various other arrangements will accomplish the same result. For instance, the magnet 18 and reactance 19 may be placed in different circuits instead of being in series and each circuit may be provided with biasing magnets operating on brake arm 14 or on separate brakes.

In order to correct for accumulative errors in frequency such as might be caused by an interruption in the supply circuit 1, I provide a master clock differential regulator designated in general by the numeral 20 of the type described in my application filed Oct. 2, 1920, Serial No. 414,161 entitled "Control sytem" and assigned to the same assignee as the present invention. This differential regulator comprises a synchronous motor 21 connected through suitable reduction gears 22 to a pulley 23, a standard timepiece 24 connected through suitable gearing 25 to a pulley 26, an endless belt 27 passing over these pulleys and supporting a weighted pulley 28 in a loop thereof and a contact device comprising a pivoted arm 29 and a stationary contact 30, controlled by the position of the pulley 28. The direction of rotation of the synchronous motor 21 and standard timepiece 24 is such as to advance the endless belt 27 in the same direction such for example as that shown by the arrows in Fig. 2. The speed relation between these pulleys is made equal when the secondary frequency is correct. It will now be evident that with the standard timepiece adjusted for accuracy and with the correct frequency maintained on the secondary system, the weighted pulley will remain in the same vertical position and there will be no up and down movement of the lever 29, the free end of which rests on the hub of pulley 28. However, if the frequency of the secondary system is low, motor 21 will run slow and the loop of belt 27 in which pulley 28 rests will lengthen allowing pulley 28 together with contact arm 29 to descend until arm 29 rests on contact 30 after which only pulley 28 will descend. The belt 27 may be made of considerable length so as to allow weight 28 to keep on descending so long as the secondary frequency is low or also to perform the same function in case the power supply of source 1 fails for any reason. It will thus be seen that the distance weight 28 descends, from its position when the secondary clocks 8 indicate accurately with the standard timepiece 24, may be taken as a measure of the accumulated error in frequency of the secondary system or a measure of the time lost by the secondary clocks. The contact lever 29 and contact 30 are connected to perform a corrective controlling function. In the present instance they are connected to short circuit the reactance 19 which will allow considerably more current to flow in coil 18 and flow down or even stop the motor 2' until the accumulated error in frequency has been corrected and the pulley 28 again raised to lift contact arm 29 from contact 30. The short circuiting of reactance 19 might be accomplished in two or more steps if desired by providing two or more contacts connected to intermediate points on the reactance and arranged to be successively closed as arm 29 descends as indicated at 30'. Likewise, additional contacts might be provided above the normal position of contact arm 29 connected for example to shunt more or less current away from magnet 18 so as to lower the secondary frequency should it become too high. Such a contact is indicated at 31 and the circuit controlled thereby preferably contains a resistance 32 so that some current will still flow through magnet 18 when contact 31 is closed.

As connected in Fig. 2 it will generally be desirable to have the speed of motor 2' adjusted to a value which under normal conditions will cause pulley 23 to run slightly slower than pulley 26 whereby the contact device 29, 30 and pulley 28 will perform a controlling function during normal operation to keep the secondary clocks 8 correct as well as to correct for accumulated errors in secondary frequency due to an interruption in the service. For example, let us assume that the apparatus in Fig. 2 is operating normally and the pulley 28 occupies the position shown when the secondary clocks 8 are correct. Now, if the speed of motor 2' is slightly too high, the frequency supplied thereby will be too low and pulley 28 will descend closing contacts 29 and 30 and short circuiting the reactance 19. The increased current flowing through magnet 18 will therefore draw brake arm 14 and pad 13 toward disc 12 and slow down or stop the motor. This increases the secondary frequency and speeds up the motor 21 and secondary clocks so that pulley 23 now runs faster than pulley 26, pulley 28 will therefore raise and open the short circuit across reactance 19 decreasing the braking effect on motor 2' which in turn increases in speed and decreases the secondary frequency. This control adjustment may be made sufficiently fine to keep the time of the secondary clocks 8 within a few seconds of the time kept by the master clock 24. Should the source 1 fail all the motors supplied by the secondary system will stop and pulley 28 will descend because the master clock still continues to function as usual. When the power again comes on, the secondary system starts up automatically and the frequency thereof will be maintained at a higher value than normal until pulley 28 again lifts lever 29 from contact 30. Thus the time lost by the secondary clocks due to the failure of the source of supply is automatically corrected after which normal operation is resumed. It should be noted that the weight 28 constitutes the source of energy for operating the clock and that this weight is raised by energy derived from the source 1.

It will be noted that the range of control of the secondary frequency may be made anything desired between the primary frequency and the maximum secondary frequency and the maximum secondary frequency may be made anything desired less than that of the primary frequency.

In accordance with the provisions of the patent statutes, I have described the principle of my invention, together with the apparatus which I now consider to represent the best embodiment thereof but I desire to have it understood that the apparatus shown is only illustrative and that the invention can be carried out by other means.

What I claim as new and desire to secure by Letters Patent of the United States, is,—

1. In combination, a source of alternating current, an induction motor of the wound secondary type having its primary connected to said source, a system of distribution supplied by the secondary of said motor and an automatic brake responsive to the speed of said motor for normally holding the speed of said motor considerably below its synchronous speed whereby said motor is caused to act both as a motor and a transformer.

2. In combination, a source of alternating current, an induction motor of the wound secondary type having its primary connected to said source, an alternating current distributing system supplied by the secondary of said motor, automatic means for normally holding the speed of said motor considerably below its synchronous speed and means independent of the load supplied to said system for adjusting said speed.

3. In combination, a commercial alternating current source, an induction motor of the wound secondary type having its primary connected to said source, an alternating current distributing system supplied by the secondary of said motor, means normally tending to hold the speed of said motor constant at a value considerably below its synchronous speed, and automatic means tending to adjust said speed to a value such that the alternating current delivered to said secondary system is of a constant periodicity.

4. In combination, a commercial source of alternating current, an induction motor of the wound secondary type having its primary connected to said source, an alternating current distributing system supplied by the secondary of said motor and automatic means for holding the speed of said motor to such a value that the average frequency of the alternating current supplied by said secondary is constant and of a value below the normal frequency of said commercial source.

5. In combination, a commercial source of alternating current, an induction motor of the wound secondary type having its primary connected to said source and its secondary connected to supply an alternating current time distributing system, automatic means tending to hold the speed of said motor constant at a value considerably below its synchronous speed, automatic means tending to cause said motor to run at such a speed as to maintain a constant secondary frequency and automatic means for adjusting the speed of said motor to correct accumulated errors in the frequency of said time distributing system.

6. A system for the indication of time by means of secondary clocks driven by self starting synchronous motors comprising a commercial source of alternating current, a variable frequency transformer having its primary connected thereto, an alternating current time distributing system supplied by the secondary of said transformer and automatic regulating means for said transformer for maintaining the average frequency of said system constant.

7. A system for the indication of time by means of secondary clocks driven by self starting synchronous motors, comprising a commercial source of alternating current a variable frequency transformer supplied thereby, an alternating current time distributing system supplied by said transformer and automatic regulating means for said transformer operated by energy derived from said commercial source for keeping the frequency of said time distributing system at a predetermined average value.

8. Frequency transforming apparatus comprising an induction motor of the wound secondary type adapted to have its primary supplied from a commercial source of alternating current and its secondary connected to supply an alternating current distributing system, a brake for said motor and means dependent upon the frequency supplied to said motor for adjusting said brake.

9. Frequency transforming apparatus comprising an induction motor of the wound secondary type, adapted to have its primary supplied from a commercial source of alternating current and its secondary connected to supply an alternating current distributing system, a brake for said motor and means dependent upon the voltage of said source for adjusting said brake.

10. Frequency transforming apparatus comprising an induction motor of the wound secondary type adapted to have its primary connected to a commercial source of alternating current and its secondary connected to supply an alternating current distributing system regulating means for causing said motor to run considerably below its synchronous speed and means dependent upon the frequency and voltage of said source for adjusting said speed regulating means.

11. A system for the indication of time by means of electrically operated secondary clocks comprising a commercial source of alternating current, an induction motor of the wound rotor type having its primary connected to said source, an alternating current time distributing system, supplied from said secondary, speed regulating means for said motor, apparatus for measuring accumulated errors in the frequency of said time distributing system, and means controlled by said apparatus for adjusting said speed regulating means in a manner to correct for said accumulated errors.

In witness whereof, I have hereunto set my hand this 5th day of July, 1922.

HENRY E. WARREN.